United States Patent
Ioffe et al.

[15] 3,636,486
[45] Jan. 18, 1972

[54] METHOD FOR ORIENTATION OF CURRENT-CONDUCTING NONMAGNETIC BODIES IN A MAGNETIC FIELD AND A DEVICE FOR CARRYING SAME INTO EFFECT

[72] Inventors: Benyamin Alexandrovich Ioffe, ulitsa Raunas, 45/2, kv. 81; Robert Karlovich Kalnin, ulitsa Gorkogo, 53, kv. 19, both of Riga, U.S.S.R.

[22] Filed: Dec. 16, 1969
[21] Appl. No.: 885,532

[30] Foreign Application Priority Data

Dec. 25, 1968 U.S.S.R. ............................ 1,289,057

[52] U.S. Cl. ........................ 335/219, 335/219, 335/229
[51] Int. Cl. ............................................... H01f 1/00
[58] Field of Search ........................... 335/219, 229, 250

[56] References Cited

UNITED STATES PATENTS 2,400,869  5/1946  Lovell ................................ 335/250
3,054,026  9/1962  Lovell ................................ 335/250

FOREIGN PATENTS OR APPLICATIONS 181,481  10/1964  U.S.S.R. ............................ 335/229

*Primary Examiner*—Bernard A. Gilheany
*Assistant Examiner*—F. E. Bell
*Attorney*—Waters, Roditi, Schwartz & Nissen

[57] ABSTRACT

A method for orientation of current-conducting nonmagnetic bodies according to which said bodies are oriented due to the effect of an AC magnetic field with a simultaneous introduction into the orientation zone of auxiliary ferromagnetic bodies which facilitate the effect of orientation, and a device for carrying said method into effect, comprising an electromagnet fed by the alternating current between whose poles the orientation zone is arranged and a means for introduction at least two auxiliary ferromagnetic bodies thereinto.

The method and device are designed for use in various branches of technology, mostly in a watchmaking industry, for rapid and clear orientation of small-size bodies (component members) according to a certain design feature.

3 Claims, 2 Drawing Figures

METHOD FOR ORIENTATION OF CURRENT-CONDUCTING NONMAGNETIC BODIES IN A MAGNETIC FIELD AND A DEVICE FOR CARRYING SAME INTO EFFECT

The present invention relates to a method for orientation of current-conducting nonmagnetic bodies in a magnetic field and to a device for carrying the same into effect. The invention may be employed in various branches of technology as, for example, in the watchmaking industry for the rapid and precise orientation of small-sized bodies.

Known heretofore is a method for the orientation of current-conducting bodies based upon the interaction between a magnetic field created by a permanent magnet and an alternating current induced in the bodies to be oriented.

The above-mentioned method is subject to certain limitations when it is applied to orient bodies whose shape provides for the flowing of the induced currents in certain directions. Moreover, the known method cannot be employed for the orientation of small-sized nonsymmetrical component members whose dimensions do not exceed a few millimeters.

It is a primary object of the present invention to eliminate the above-mentioned disadvantages.

The invention is aimed at the provision of a method for the orientation of current-conducting nonmagnetic bodies in a magnetic field and a device for carrying said method into effect both featuring wider possibilities for application thereof, a substantially increased orientation effect and the possibilities to orient small-sized bodies whose dimensions are as those mentioned hereinabove.

This object is accomplished by the fact that in the herein disclosed method for orientation of current-conducting nonmagnetic bodies, according to the present invention, the latter are oriented due to the effect of an AC magnetic field with the simultaneous introduction into the orientation zone of auxiliary ferromagnetic elements to deform the magnetic field involved, said ferromagnetic elements being placed close to preset portions in the body to be oriented with resultant increased orientation effects.

The frequency of the magnetic field is selected depending upon a preselected relationship between the inductive and pure resistances of the body to be oriented.

The device for carrying the contemplated method into effect, according to the present invention, comprises an AC fed electromagnet between the poles of which are arranged both the zone for orientation and at least two ferromagnetic elements placed on a movable foundation or pusher which is adapted to introduce said elements into the zone for orientation simultaneously with the body to be oriented.

The contemplated method for orientation of current-conducting nonmagnetic bodies and the device for carrying said method into effect according to the present invention, successfully, achieve the above-mentioned objects and feature wider general-purpose characteristics which make it possible to act upon any asymmetrical portion of a wide range of bodies, such as round bodies, flat bodies, etc.

The invention will be more clearly understood from a detailed consideration of the herein-disclosed method for the orientation of bodies and an exemplary device for carrying said method into effect with due reference to the accompanying drawings, wherein.

Figure 1:
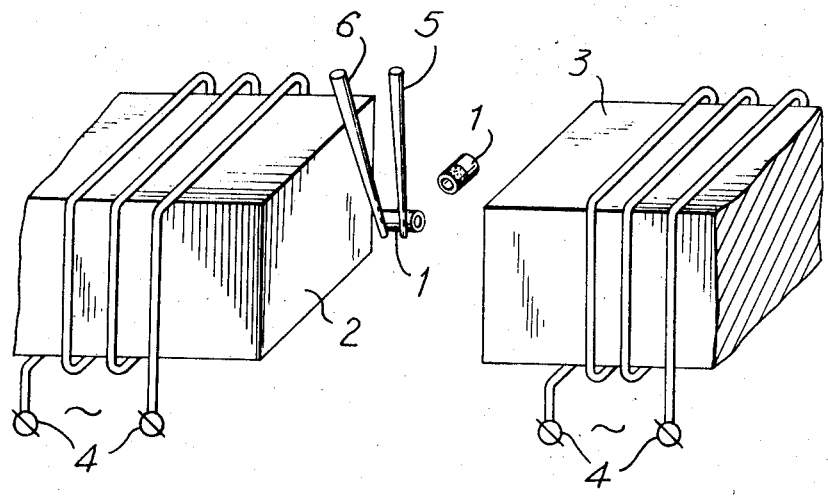
FIG. 1 represents a zone for orientation within an interpole space with a component member or part to be oriented and auxiliary ferromagnetic elements introduced thereinto.

The method for the orientation of current-conducting nonmagnetic bodies in a magnetic field in accordance with the invention is as follows:

In FIG. 1, the body to be oriented such as a bush or bushing 1 is introduced into an orientation zone formed by the space between the pole ends 2 and 3 of an electromagnet whose winding 4 is fed by alternating current. Introduced simultaneously with the bush or bushing 1 into its orientation zone are ferromagnetic elements 5 and 6 which are placed in close justaposition to the above-mentioned bush or bushing 1. The body to be oriented is thus effected by an external a c magnetic field which induces current in the body involved, and concurrently said external magnetic field is deformed adjacent to the preset portions of the body being oriented due the introduction into the orientation zone of ferromagnetic elements which accelerates the process of orientation and makes it more precise.

The moment of the effort of the orientation of the bodies involved may be changed by varying the AC frequency by any heretofore known means depending upon the selected relationship between the inductive and pure resistances of the body being oriented. Thus, for example, with the AC frequency at which the inductive and pure resistances of the body being oriented are equal, the moment of said effort will be the highest.

Figure 2:
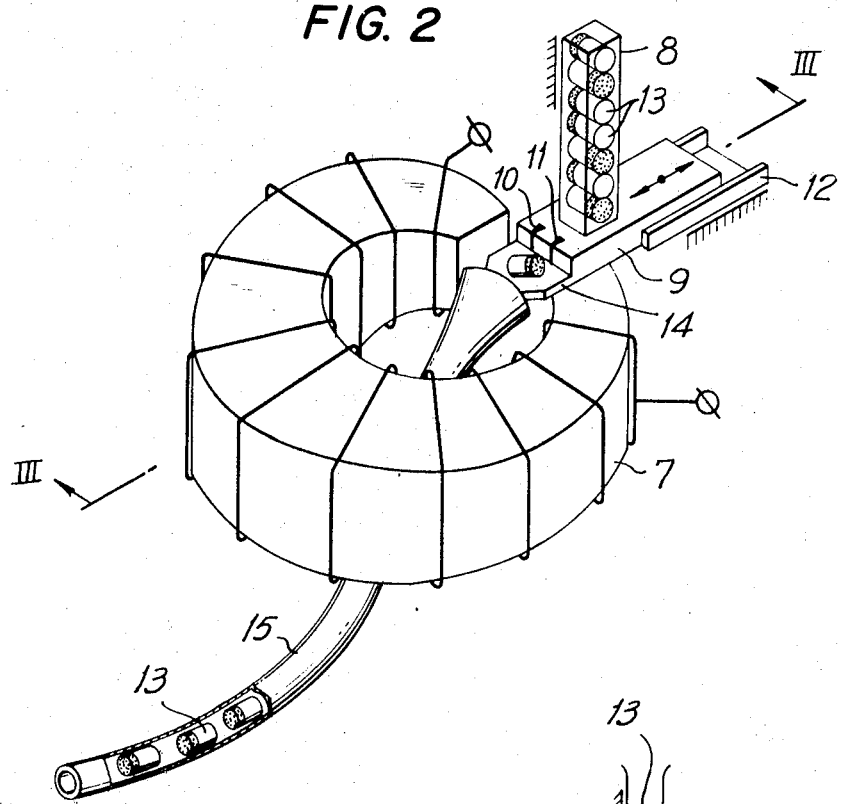
FIG. 2 is a general view of a device for putting an orientation method into effect, according to the present invention.
Figure 3:
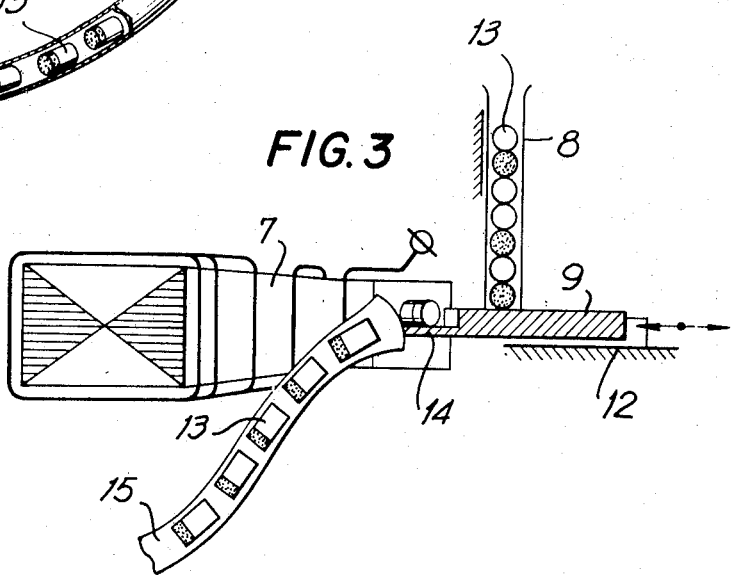
FIG. 3 is a sectional view taken along the line III—III of FIG. 2.

The herein-disclosed method of orientation of the bodies may be carried into effect through the use of the device shown in FIGS. 2 and 3. As can be clearly seen from FIGS. 2 and 3, the contemplated device comprises an electromagnet 7 whose winding is fed alternating current. There is also a feeding means which consists of a feeder 8, a pusher 9 provided with two ferromagnetic elements such as, for example, steel needles 10 and 11, made fast thereon and a guide 12. The feeder 8 and the guide 12 are fixed in position.

The contemplated device operates as follows.

A component member or part 13 is fed from the feeder 8 onto a platform 14 of the pusher 9 which simultaneously introduces into the interpole space of the electromagnet (orientation zone) the component member or part 13 and the steel needles 10 and 11. The component member or part 13 is set into the preset and already oriented position and is delivered to a take-up trough 15, while the pusher 9 with the needles 10 and 11 returns to the initial position whereupon the entire process is repeated. The electromagnet is supplied with current only while the component member or part 13 is within the orientation zone.

What is claimed is:

1. A method for the orientation of current-conducting nonmagnetic bodies, said method comprising orienting said bodies with an a c magnetic field in an orientation zone and simultaneously introducing into the orientation zone ferromagnetic elements to deform the magnetic field, said ferromagnetic elements being placed close to the bodies to be oriented to produce an increased orientation effect.

2. A method as claimed in claim 1, wherein the AC frequency is adjusted to obtain a relationship between the pure and inductive resistances of the body being oriented to optimize the orientation effect.

3. A device for orientation of current-conducting nonmagnetic bodies, comprising: an electromagnet adapted for being supplied alternating current and including poles between which is an orientation zone; at least two ferromagnetic elements; and means to introduce said ferromagnetic elements into the orientation zone simultaneously with said bodies to be oriented.

* * * * *